United States Patent
Kobayashi et al.

(10) Patent No.: US 9,643,365 B2
(45) Date of Patent: May 9, 2017

(54) COVER FOR AIR CONDITIONING DEVICE FOR VEHICLE, AND METHOD FOR MANUFACTURING SAME

(71) Applicant: MITSUBISHI ELECTRIC CORPORATION, Chiyoda-ku (JP)

(72) Inventors: Hiroki Kobayashi, Chiyoda-ku (JP); Shinsuke Okano, Chiyoda-ku (JP); Kosuke Umemura, Chiyoda-ku (JP); Hajime Takeya, Chiyoda-ku (JP); Masami Kume, Chiyoda-ku (JP); Sohei Samejima, Chiyoda-ku (JP); Michihito Matsumoto, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 277 days.

(21) Appl. No.: 14/390,823

(22) PCT Filed: May 14, 2013

(86) PCT No.: PCT/JP2013/063422
§ 371 (c)(1),
(2) Date: Oct. 6, 2014

(87) PCT Pub. No.: WO2013/172345
PCT Pub. Date: Nov. 21, 2013

(65) Prior Publication Data
US 2015/0084242 A1    Mar. 26, 2015

(30) Foreign Application Priority Data

May 14, 2012   (JP) .................................. 2012-110362

(51) Int. Cl.
*B29C 70/68*    (2006.01)
*B29C 70/44*    (2006.01)
(Continued)

(52) U.S. Cl.
CPC .............. *B29C 70/78* (2013.01); *B29C 39/10* (2013.01); *B29C 70/443* (2013.01); *B29C 70/48* (2013.01);
(Continued)

(58) Field of Classification Search
CPC ..... B29C 70/682; B29C 70/48; B29C 70/443; B29C 70/865; B60H 1/00371; B60H 1/00514; B32B 5/245; B61D 27/00
See application file for complete search history.

(56) References Cited

U.S. PATENT DOCUMENTS

| | | | |
|---|---|---|---|
| 6,918,985 B2 * | 7/2005 | Geyer .................... | B29C 70/086 156/245 |
| 2014/0250800 A1 * | 9/2014 | Hirashima ............. | B61D 17/12 52/45 |

FOREIGN PATENT DOCUMENTS

| | | |
|---|---|---|
| JP | 3 43017 | 4/1991 |
| JP | 3-262635 A | 11/1991 |

(Continued)

OTHER PUBLICATIONS

Dow Technology Bulletin, "Open Cell or Closed Cell" dated Oct. 2006.*
(Continued)

*Primary Examiner* — Robert B Davis
(74) *Attorney, Agent, or Firm* — Oblon, McClelland, Maier & Neustadt, L.L.P.

(57) ABSTRACT

A cover for an air conditioning device for a railway vehicle is a cover for an air conditioning device for a vehicle, which covers an air-conditioner main body. The cover includes a core made of a foamed material having heat insulating property, and a surface member made of a fiber reinforced plastic, which covers entire surfaces of the core. The core is deformed into a curved shape by elastic deformation.

6 Claims, 3 Drawing Sheets

(51) Int. Cl.

| | | |
|---|---|---|
| *B29C 70/48* | (2006.01) | |
| *B29C 70/78* | (2006.01) | |
| *B61D 27/00* | (2006.01) | |
| *B29C 39/10* | (2006.01) | |
| *B29C 70/86* | (2006.01) | |
| *B60H 1/00* | (2006.01) | |
| *F25D 23/02* | (2006.01) | |
| *B32B 5/24* | (2006.01) | |
| *B32B 1/00* | (2006.01) | |
| *B29K 101/10* | (2006.01) | |
| *B29K 105/04* | (2006.01) | |
| *B29K 105/06* | (2006.01) | |
| *B29L 9/00* | (2006.01) | |
| *B29L 31/30* | (2006.01) | |

(52) U.S. Cl.
CPC .......... *B29C 70/682* (2013.01); *B29C 70/865* (2013.01); *B32B 1/00* (2013.01); *B32B 5/245* (2013.01); *B60H 1/00371* (2013.01); *B60H 1/00514* (2013.01); *B61D 27/00* (2013.01); *F25D 23/02* (2013.01); *B29K 2101/10* (2013.01); *B29K 2105/046* (2013.01); *B29K 2105/06* (2013.01); *B29L 2009/00* (2013.01); *B29L 2031/3041* (2013.01); *B32B 2260/021* (2013.01); *B32B 2260/046* (2013.01); *B32B 2262/0269* (2013.01); *B32B 2262/101* (2013.01); *B32B 2262/103* (2013.01); *B32B 2266/08* (2013.01); *B32B 2307/304* (2013.01); *B32B 2307/51* (2013.01); *B32B 2605/10* (2013.01)

(56) References Cited

FOREIGN PATENT DOCUMENTS

| | | |
|---|---|---|
| JP | 6 72326 | 3/1994 |
| JP | 7 125118 | 5/1995 |
| JP | 11 216830 | 8/1999 |
| JP | 2000 55403 | 2/2000 |
| JP | 2000 264199 | 9/2000 |
| JP | 2006 130873 | 5/2006 |
| JP | 2006-273099 A | 10/2006 |
| JP | 2008-55628 A | 3/2008 |
| JP | 2009-241559 A | 10/2009 |
| JP | 2011 218677 | 11/2011 |

OTHER PUBLICATIONS

Partial machine translation of JP2002241559A dated Oct. 2009 obtained from the espace website.*
Extended European Search Report issued on Jan. 12, 2016 in European Patent Application No. 13791701-9.
International Search Report Issued Aug. 20, 2013 in PCT/JP13/063422 Filed May 14, 2013.

* cited by examiner

FIG. 6

| YOUNG'S MODULUS | 6 | 10 | 22 | 26 | 59 | 70 | 180 |
|---|---|---|---|---|---|---|---|
| POSSIBILITY OF SHAPING UNDER OWN WEIGHT | ○ | ○ | ○ | ○ | × | × | × |
| CHANGE IN THICKNESS AT ATMOSPHERIC PRESSURE | × | ○ | ○ | ○ | ○ | ○ | ○ |

COVER FOR AIR CONDITIONING DEVICE FOR VEHICLE, AND METHOD FOR MANUFACTURING SAME

TECHNICAL FIELD

The present invention relates to a cover for an air conditioning device for a vehicle, which is to be mounted, for example, on a ceiling portion of a railway vehicle, and to a method of manufacturing the same.

BACKGROUND ART

Hitherto, as a cover for an air conditioning device for a vehicle, there is known a cover including an arch-like plate, reinforcing members provided on the outer side of the plate, and a heat insulating material provided on the inner side of the plate (see Patent Literature 1, for example).

On the other hand, a fiber reinforced plastic (FRP) sandwich panel including a foamed material as a core is known to be capable of light-weighting while keeping stiffness and to have excellent heat insulating property (see Patent Literature 2, for example).

CITATION LIST

Patent Literature

[PTL 1] JP 06-72326 A
[PTL 2] JP 2006-130873 A

SUMMARY OF INVENTION

Technical Problems

However, the cover described in Patent Literature 1 includes the plate, which is a stainless plate. Moreover, the reinforcing members are angle bars, and therefore a total weight is large. Moreover, the reinforcing members are required to be fixed by welding onto an upper surface of the plate, whereas the heat insulating material is required to be bonded onto a lower surface of the plate. Therefore, there is a problem of low productivity.

In the case of the FRP sandwich panel described in Patent Literature 2, thermal processing or cutting work is required to be performed in advance on a core material in order to obtain a curved shape required for the cover for an air conditioning device for a vehicle. Therefore, productivity is low. Moreover, when a molding die is used, a die having a curved shape, which costs high, is required to be used. Thus, there is a problem in that costs run up.

The present invention has been made to solve the problems described above, and has an object to provide a cover for an air conditioning device for a vehicle, which is capable of light-weighting and improving productivity at low costs, and a method of manufacturing the same.

Solution to Problems

According to one embodiment of the present invention, there is provided a cover for an air conditioning device for a vehicle, the cover including: a core made of a foamed material having heat insulating property; and a surface member for covering entire surfaces of the core, the surface member being made of a fiber reinforced plastic obtained by impregnating fibers with a resin, in which the core is elastically deformed into a curved shape.

Further, according to one embodiment of the present invention, there is provided a method of manufacturing the cover for an air conditioning device for a vehicle, the method including the steps of:

shaping the core including closed cells and the fibers by flexing an intermediate portion of the core to be elastically deformed in a state in which the core is supported at two points corresponding to both end portions of the core on a molding die having a curved shape;

impregnating the fibers with the resin by injecting the resin into a sealed space formed between the molding die and the core by vacuuming; and demolding the cover from the molding die after the resin is cured.

Advantageous Effects of Invention

According to the cover for an air conditioning device for a vehicle of one embodiment of the present invention, the cover includes the core made of the foamed material having the heat insulating property and the surface member made of the fiber reinforced plastic, which covers the entire surfaces of the core. Therefore, lightweight property is obtained, whereas an additional step of bonding a heat insulating material is not required. Therefore, productivity is improved.

Moreover, the core is elastically deformed into a curved shape. Therefore, as compared to a cover including a core, which is not elastically deformed, that is, a cover including a core, which is subjected to thermal deformation or deformation by cutting work or with a molding die in advance, a repelling force is large with respect to an external force. Thus, a withstand load increases.

Moreover, according to the method of manufacturing the cover for an air conditioning device for a vehicle of one embodiment of the present invention, the core is elastically deformed into a curved shape under, for example, its own weight in the shaping step. Therefore, a step of deforming the core into the curved shape by thermal, cutting, or the molding die is not required. Therefore, the productivity is improved at low costs.

BRIEF DESCRIPTION OF DRAWINGS

FIG. 6 is a table showing a relationship between a Young's modulus of a core and elastic deformation of the core under its own weight.

DESCRIPTION OF EMBODIMENTS

Figure 1:
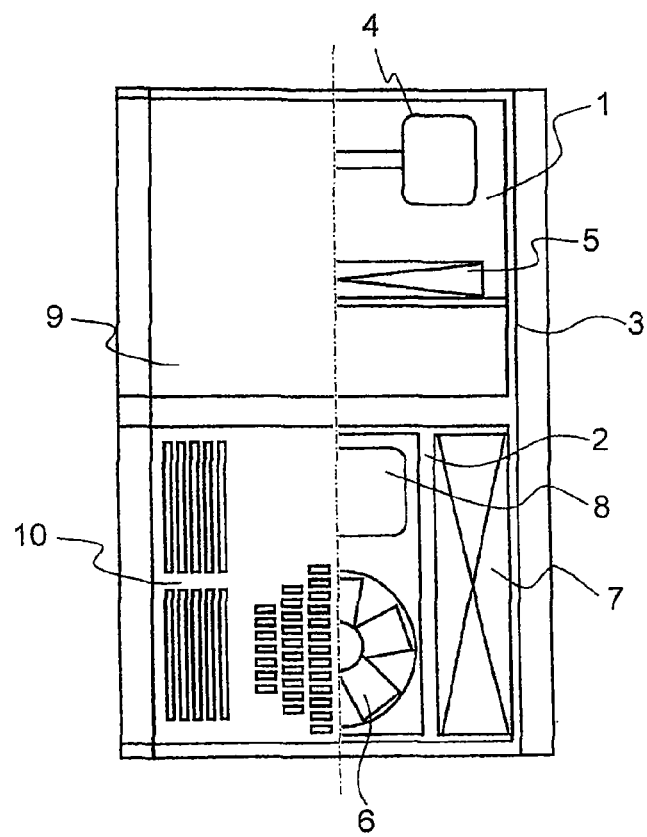
FIG. 1 is a plan view of an air conditioning device for a railway vehicle, onto which covers for an air conditioning device for a railway vehicle are mounted according to a first embodiment of the present invention.

Referring to the drawings, embodiments of the present invention are described below. In the drawings, the same or corresponding components and parts are denoted by the same reference symbols.

First Embodiment

FIG. 1 is a plan view illustrating an air conditioning device for a railway vehicle, onto which covers 9 and 10 for an air conditioning device for a railway vehicle are mounted according to a first embodiment of the present invention. In the figure, right halves of the covers 9 and 10 are cut out.

The air conditioning device for a railway vehicle is mounted onto a ceiling portion of the vehicle, and includes an indoor unit portion 1, which is in communication to a vehicle indoor side, an outdoor unit portion 2, a casing 3, which houses the indoor unit portion 1 and the outdoor unit portion 2 therein, and an indoor cover 9 for covering the indoor unit portion 1 and an outdoor cover 10 for covering the outdoor unit portion 2, each being exposed to outside air.

Figure 2:
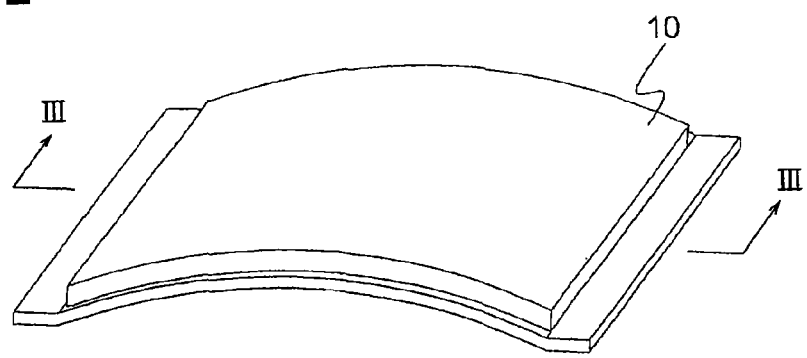
FIG. 2 is a perspective view illustrating an outdoor cover illustrated in FIG. 1.

Each of the indoor cover 9 and the outdoor cover 10 is, as illustrated in FIG. 2, rectangular, and has a curved shape with a curved surface projecting upward at a curvature of from 1,500 mm to 2,500 mm, the curvature being suitably 1,800 mm in order to maximally using a space from the viewpoint of a vehicle gauge.

The indoor cover 9 and the outdoor cover 10 cover an air-conditioner main body, which includes the indoor unit portion 1 and the outdoor unit portion 2.

The indoor unit portion 1 includes an indoor fan 4 and an indoor heat exchanger 5.

The outdoor unit portion 2 includes an outdoor fan 6, an outdoor heat exchanger 7, and a compressor 8.

Figure 3:
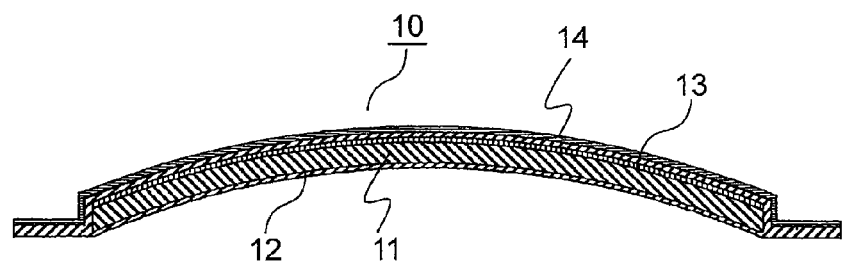
FIG. 3 is a sectional view taken along the line III-III of FIG. 2, for illustrating the outdoor cover illustrated in FIG. 2 as viewed from the direction of the arrows.

FIG. 3 is a sectional view taken along the line of FIG. 2 as viewed from the direction of the arrows.

The outdoor cover 10 is manufactured by Vacuum assist Resin Transfer Molding (VaRTM), and includes a core 11 made of a foamed material having heat insulating property and closed cells, a surface member 12 made of a fiber reinforced plastic (FRP; hereinafter referred to as "FRP"), which covers the entire surfaces of the core 11 elastically deformed into a curved shape, a resin diffusion medium 13 interposed between an upper surface of the core 11 and the surface member 12, and a gel coat 14, which covers an upper surface of the surface member 12, all of which are integrated with each other.

The FRP is obtained by impregnating a carbon reinforcing fiber, which is excellent in lightness, mechanical properties, thermal properties, optical properties, and a degree of freedom of a molding method, with a vinyl ester resin as a base material resin.

Note that, as a reinforcing fiber, there may be used, for example, a glass fiber, an aramid fiber, a Kevlar fiber, a boron fiber, or an alumina fiber.

In addition, as the base material resin, there may be used, for example, a thermosetting resin such as an epoxy resin, an unsaturated polyester resin, a furan resin, or a polyurethane resin instead of the vinyl ester resin.

The fiber may be, for example, a staple fiber or a filament fiber. The filament fiber is used from the viewpoint of mechanical properties, and a textile fiber is used as a form of the fiber.

The core 11 has a Young's modulus of from 9 to 33 MPa and heat insulating property above the flame-retardance acceptance criteria defined in the Material Combustion Test for Vehicles of Railroad (Article 83 of "Technical Regulatory Standards on Japanese Railways" (Ordinance No. 151 prescribed by the Ministry of Land, Infrastructure, Transport and Tourism, Dec. 25, 2001) and is made of a foamed material including closed cells, which is a thermosetting resin. Specifically, the core 11 is made of a phenolic-resin foamed material.

A thickness of the core 11 is set so that required heat insulating property and bending stiffness are obtained, and is suitably 3 to 30 mm, more preferably 9 mm. The thickness equal to or larger than 30 mm is not desired because a volume occupied by the outdoor cover 10 becomes larger. With the thickness equal to or smaller than 3 mm, the stiffness required as the outdoor cover 10 is not obtained.

As the Young's modulus of the core 11, there is adopted such a Young's modulus that deformation at an atmospheric pressure that the core undergoes in a manufacturing step described later is suppressed within an allowable range, and that the core 11 is deformed at a predetermined curvature.

For the deformation, an external force such as the atmospheric pressure, to which the core 11 is subjected at the time of vacuuming, by a weight or the like may also be used. However, the deformation into the curved shape at the predetermined curvature under its own weight is more preferred.

Specifically, a Young's modulus E is set within the range of a value obtained by the following formula using a curvature R of a predetermined shape, a length l, a thickness t, a width b, a density ρ, an atmospheric pressure P, and a dimensional tolerance f.

[Math. 1]

$$\frac{tP}{f} \le E \le \frac{5 \, \rho t l^4}{32 t^3 \left(R - \sqrt{R^2 - \frac{l^2}{4}}\right)} \quad (1)$$

Formula (1) is derived based on the fact that a deflection amount obtained from Formula (2):

[Math. 2]

$$\delta_{max} = \frac{5 \, \rho t b l^4}{32 b E t^3} \quad (2)$$

for a maximum deflection amount δmax of a two-point support beam having a rectangular cross section, which is subjected to its own weight, exceeds a maximum depth D,

[Math. 3]

$$D = R - \sqrt{R^2 - \frac{l^2}{4}} \quad (3)$$

of a curved surface having the curvature R and the length l and that a change in plate thickness under the atmospheric pressure P:

[Math. 4]

$$\Delta t = \varepsilon t = \frac{P}{E}t \quad (4)$$

falls within an allowable deformation amount f.

By substituting t=9 mm, f=0.1 mm (fine-degree general dimensional tolerance), R=1,800 mm, l=1,800 mm, ρ=0.00000004 kg/mm³ into Formula (1) as the most preferred conditions, the best mode can be realized with the Young's modulus E of from 9 MPa to 33 MPa.

FIG. 6 shows the results of a test for whether or not the core 11 with a thickness of 9 mm, which is placed in a molding die having a curvature of 1,800 mm and is deformed under its own weight, is actually deformed to lie along the molding die and the results of a test for whether or not a plate-thickness change occurring when the core 11 covered with a bagging film is subjected to vacuuming is within the fine-degree general dimensional tolerance of 0.1 mm, the results being marked with circles and crosses.

From the above-mentioned results, it is verified that the core 11 having the Young's modulus E of from 9 MPa to 33 MPa is deformed to lie along the curvature of 1,800 mm under its own weight without undergoing a thermal processing or cutting work step and that the deformation at the atmospheric pressure can be suppressed within the fine-degree general dimensional tolerance.

The resin diffusion medium 13 includes a net-like flow channel formed therein. A vinyl ester resin, which is a matrix resin, flows through the flow channel so that carbon reinforcing fibers are impregnated therewith.

A carbon fiber is used as a material for the resin diffusion medium 13 from thermal and mechanical viewpoints.

Note that, the material for the resin diffusion medium 13 may be, for example, a glass fiber, an aramid fiber, a Kevlar fiber, a boron fiber, an alumina fiber, a thermosetting resin such as an epoxy resin, an unsaturated polyester resin, a vinyl ester resin, a furan resin, or a polyurethane resin, or a thermoplastic resin such as a nylon, a PBT, or a ABS.

As the gel coat 14, an unsaturated polyester resin, which has flame retardance provided by bromination, is used from the viewpoint of the flame retardance so as to prevent the interior of the outdoor cover 10 from being adversely affected by light, water, heat, or the like.

Note that, a material for the gel coat 14 may be, for example, a thermosetting resin such as an epoxy resin, a vinyl ester resin, a furan resin, or a polyurethane resin.

Note that, a configuration of the indoor cover 9 is the same as that of the outdoor cover 10, and the description thereof is herein omitted.

Next, a method of manufacturing the outdoor cover 10 for the air conditioning device for a railway vehicle according to the first embodiment of the present invention is described.

First, onto a molding die 15, which is subjected to demolding processing with a Teflon (trademark) coating, a gel coat resin is applied by using a spray gun to form the gel coat 14.

Next, a predetermined number of layers of textile fibers 16 are laminated in a predetermined direction on the gel coat 14.

Thereafter, the resin diffusion medium 13 is laminated thereon. Although the resin diffusion medium 13 may be laminated between the textile fibers 16 and the gel coat 14 or between the textile fibers, the resin diffusion medium 13 is provided between the textile fibers 16 and the core 11 from the viewpoint of design.

Next, the core 11 is placed on the resin diffusion medium 13.

Figure 4:
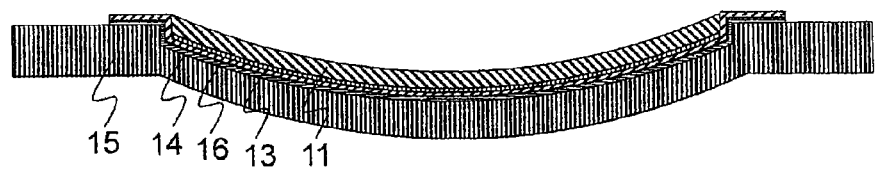
FIG. 4 is a sectional view illustrating a shaping step among steps of manufacturing the outdoor cover illustrated in FIG. 2 by a vacuum impregnation molding method.

In this manner, in a shaping step in which the textile fibers 16, the resin diffusion medium 13, and the core 11 are shaped sequentially on the molding die 15, the core 11 is deformed under its own weight so as to lie along the molding die 15 having the curvature of 1,800 mm, as illustrated in FIG. 4.

Figure 5:
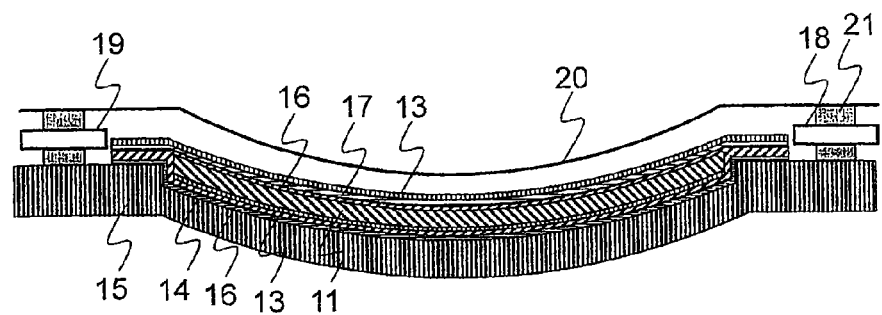
FIG. 5 is a sectional view illustrating an impregnation step among the steps of manufacturing the outdoor cover illustrated in FIG. 2 by the vacuum impregnation molding method.

Next, as illustrated in FIG. 5, a predetermined number of layers of the textile fibers 16 are laminated in a predetermined direction.

A peel ply 17 is laminated thereon. Then, the resin diffusion medium 13 is provided thereon.

Next, an intake port 18 for air to a vacuum pump and an injection port 19 for a resin to be injected from a resin tank (not shown) are mounted to the molding die 15. The entirety is covered with a bagging film 20. A periphery of the bagging film 20 is bonded to the molding die 15 with a sealant 21 so as to prevent air leakage.

Thereafter, the interior including the textile fibers 16, which is covered with the bagging film 20, is placed into a vacuum state by using the vacuum pump. Then, a valve is released to inject the resin.

The interior covered with the bagging film 20 is placed into the vacuum state. The resin passes through the two resin diffusion media 13 to be diffused in all the fibers while the textile fibers 16 are impregnated in a thickness direction (impregnation step).

After the impregnation step, the valve is closed to cure the resin.

After the resin is cured, the bagging film 20, one of the resin diffusion media 13, which is located on the upper side, and the peel ply 17 are removed. Finally, the outdoor cover 10 for the air conditioning device for a railway vehicle, in which the entire surfaces of the core 11 are covered with the surface member 12 made of the FRP, is demolded from the molding die 15.

Note that, the indoor cover 9 is also manufactured by the same method as that for the outdoor cover 10.

As described above, each of the covers 9 and 10 for the air conditioning device for a railway vehicle according to this embodiment includes the core 11 made of the foamed material having the heat insulating property and the surface member 12 made of the FRP, in which the fibers are impregnated with the resin, for covering the entire surfaces of the core 11. Therefore, lightweight property is obtained, whereas an additional step of bonding a heat insulating material is not required. Thus, productivity is improved.

Moreover, the core 11 is deformed into the curved shape by the elastic deformation under its own weight. Therefore, as compared to a cover including a core, which is not elastically deformed, that is, a cover including a core, which is subjected to thermal deformation or deformation by cutting work or with a molding die in advance, the covers have a large repellant force with respect to the external force. Therefore, a withstand load increases.

Moreover, the core 11 is made of the foamed material and includes the closed cells, and hence the interior of the core 11 is not impregnated with the resin. Thus, for manufacturing the covers 9 and 10, a vacuum impregnation molding method can be employed.

Moreover, the core 11 is made of the formed material including the closed cells, which has the Young's modulus of from 9 MPa to 33 MPa and the thickness of from 3 mm to 30 mm. An intermediate portion of the core 11 is flexurally deformed in a state in which the core 11 is supported at two points corresponding to both end portions before being covered with the surface member 12. Therefore, each of the covers 9 and 10 can realize the curved surface at the curvature of from 1,600 mm to 2,000 mm under its own weight. Thus, the thermal processing or cutting work is not required, thereby improving the productivity.

Moreover, the fibers are carbon fibers having high specific strength and specific stiffness. Thus, the covers 9 and 10 can be light-weighted.

Moreover, the surface member 12 and the core 11 are above the flame-retardance acceptance criteria in the Material Combustion Test for Vehicles of Railroad. Thus, for the covers 9 and 10, the flame retardance for railway vehicles can be ensured.

Moreover, the core 11 is made of the phenolic resin, which is a thermosetting resin. Therefore, the covers 9 and 10 excellent in mechanical properties and heat resistance can be obtained.

Further, according to the method of manufacturing the covers 9 and 10 for the air conditioning device for a vehicle according to this embodiment, for the core 11 made of the foamed material including the closed cells, the interior of the core 11 is not impregnated with the resin when the covers 9 and 10 are manufactured by the vacuum impregnation molding method.

Moreover, in the shaping step of shaping the core 11 on the molding die 15, the core 11 is deformed to be curved under its own weight at room temperature. Thus, for the deformation of the core 11, the thermal processing or cutting step is not required. As a result, the productivity of the covers 9 and 10 is improved. Moreover, the formation of the curved shape is achieved without using a molding die having a curved shape, which costs high. Thus, low-cost production is achieved.

Note that, although the core 11 is deformed to be curved under its own weight in the embodiment described above, the core 11 may also be deformed to be curved by an external force with a weight.

When the weight is used, it is only necessary to use a material, which is not broken even after being deformed at an aimed curvature.

Note that, when the weight is used, the core 11 is deformed into the curved shape in a shorter time period as compared to the case of being deformed under the own weight. Thus, the productivity of the covers 9 and 10 is improved correspondingly.

Moreover, the external force has been described by taking the weight as an example herein. However, the above-mentioned deformation may also be realized by using an external force such as a pressure in the vacuuming, autoclave, or the like, a magnetic force, or an adhesive force.

Note that, although the covers for the air conditioning device for a railway vehicle and the method of manufacturing the same have been described in the embodiment described above, as a matter of course, the present invention is not limited thereto. The present invention may also be applied to, for example, covers for air conditioning devices for tramcars and buses.

REFERENCE SIGNS LIST

1 indoor unit portion, 2 outdoor unit portion, 3 casing, 4 indoor fan, 5 indoor heat exchanger, 6 outdoor fan, 7 outdoor heat exchanger, 8 compressor, 9 indoor cover, 10 outdoor cover, 11 core, 12 surface member, 13 resin diffusion medium, 14 gel coat, 15 molding die, 16 textile fiber, 17 peel ply, 18 intake port, 19 injection port, 20 bagging film, 21 sealant.

The invention claimed is:

1. A method of manufacturing a cover including
a core made of a foamed material having heat insulating property, and
a surface member for covering entire surfaces of the core, the surface member being made of a fiber reinforced plastic obtained by impregnating fibers with a resin, the method comprising:
shaping the core comprising closed cells and the fibers by flexing an intermediate portion of the core to be elastically deformed under its own weight in a state in which the core is supported at two points corresponding to both end portions of the core on a molding die having a curved shape;
impregnating the fibers with the resin by injecting the resin into a sealed space formed between the molding die and the core by vacuuming; and
demolding the cover from the molding die after the resin is cured.

2. A method of manufacturing the cover according to claim 1, wherein the shaping comprises elastically deforming the core at room temperature.

3. A method of manufacturing the cover according to claim 2, wherein the core has a Young's modulus E calculated by the following Formula with a curvature R, a length l, a thickness t, a density ρ, an atmospheric pressure P, and an allowable deformation amount f:

$$\frac{tP}{f} \leq E \leq \frac{5 \rho t l^4}{32 t^3 \left( R - \sqrt{R^2 - \frac{l^2}{4}} \right)}.$$

4. A method of manufacturing the cover according to claim 1, wherein the shaping comprises elastically deforming the core by an external force at room temperature.

5. A method of manufacturing the cover according to claim 3, wherein the core has the Young's modulus of from 9 to 33 MPa.

6. A method of manufacturing the cover according to claim 1, wherein the core is made of a thermosetting resin.

* * * * *